US007110399B2

(12) United States Patent
Banerjee et al.

(10) Patent No.: US 7,110,399 B2
(45) Date of Patent: Sep. 19, 2006

(54) SYSTEM AND METHOD FOR REDIRECTING NETWORK ADDRESSES FOR DEFERRED RENDERING

(75) Inventors: Dwip N. Banerjee, Austin, TX (US); Lilian Sylvia Fernandes, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 10/112,486

(22) Filed: Mar. 28, 2002

(65) Prior Publication Data

US 2003/0185197 A1  Oct. 2, 2003

(51) Int. Cl.
*H04L 12/56* (2006.01)
(52) U.S. Cl. .................... 370/389; 709/219
(58) Field of Classification Search .............. 370/389, 370/390
See application file for complete search history.

(56) References Cited

U.S. PATENT DOCUMENTS

| | | | | |
|---|---|---|---|---|
| 4,058,838 A * | 11/1977 | Crager et al. | ............... | 358/425 |
| 5,812,930 A | 9/1998 | Zavrel | ......................... | 455/5.1 |
| 5,918,239 A | 6/1999 | Allen et al. | .................. | 707/526 |
| 6,073,142 A * | 6/2000 | Geiger et al. | ............... | 715/500 |
| 6,076,734 A | 6/2000 | Dougherty et al. | .... | 235/462.01 |
| 6,088,127 A * | 7/2000 | Pieterse | ...................... | 358/407 |
| 6,164,541 A | 12/2000 | Dougherty et al. | .... | 235/462.01 |
| 6,289,346 B1 | 9/2001 | Milewski et al. | ............. | 707/10 |
| 6,311,180 B1 | 10/2001 | Fogarty | ......................... | 707/4 |
| 6,499,055 B1 * | 12/2002 | Yamaguchi | ................. | 709/206 |
| 6,941,349 B1 * | 9/2005 | Godfrey et al. | ............. | 709/207 |
| 6,965,926 B1 * | 11/2005 | Shapiro et al. | ............. | 709/219 |
| 2001/0005864 A1 | 6/2001 | Mousseau et al. | .......... | 709/318 |
| 2001/0021649 A1 | 9/2001 | Kinnunen et al. | .......... | 455/412 |
| 2001/0035976 A1 | 11/2001 | Poon | ........................ | 358/1.15 |
| 2001/0044808 A1 | 11/2001 | Milewski et al. | ........... | 707/204 |
| 2001/0054115 A1 * | 12/2001 | Ferguson et al. | ........... | 709/248 |
| 2002/0138581 A1 * | 9/2002 | MacIntosh et al. | ......... | 709/206 |
| 2002/0188689 A1 * | 12/2002 | Michael | ...................... | 709/206 |
| 2003/0093483 A1 * | 5/2003 | Allen et al. | .................. | 709/207 |
| 2004/0005040 A1 * | 1/2004 | Owens et al. | ............. | 379/93.24 |
| 2004/0199657 A1 * | 10/2004 | Eyal et al. | .................. | 709/231 |
| 2005/0028195 A1 * | 2/2005 | Feinleib et al. | ............... | 725/32 |
| 2005/0055627 A1 * | 3/2005 | Lloyd et al. | ................. | 715/505 |
| 2005/0120305 A1 * | 6/2005 | Engstrom et al. | ........... | 715/760 |

FOREIGN PATENT DOCUMENTS

EP  1061440 A2  12/2000

* cited by examiner

*Primary Examiner*—Hassan Kizou
*Assistant Examiner*—Anthony Sol
(74) *Attorney, Agent, or Firm*—VanLeeuwen & VanLeeuwen; Casimer K. Salys

(57) ABSTRACT

A system and method for forwarding URL's to one or more recipients using a Wireless Access Protocol (WAP) network is provided. A mobile user views web pages on his WAP enabled wireless device, such as a mobile telephone or PDA. When the mobile user locates a web page that he prefers to view later or wants to send to another user, the mobile user invokes redirect software which composes a redirect request that includes one or more redirect entries. Each redirect entry corresponds to a redirect address and a URL. When the user finishes with selecting one or more redirect addresses, the mobile device sends the redirect request to a WAP gateway. The WAP gateway receives the redirect requests and forwards the redirect entries to the corresponding redirect addresses over a computer network, such as the Internet.

16 Claims, 8 Drawing Sheets

SYSTEM AND METHOD FOR REDIRECTING NETWORK ADDRESSES FOR DEFERRED RENDERING

BACKGROUND OF THE INVENTION

1. Technical Field

The present invention relates in general to a system and method for redirecting a web page in a wireless environment. More particularly, the present invention relates to a system and method for using a Wireless Access Protocol (WAP) gateway to forward a selected URL to a user's account for viewing at a later time.

2. Description of the Related Art

The Internet includes a vast amount of information for a user to access. The user may want to access the information when he is not at a computer terminal. For example, the user may want to know the location of restaurants or gas stations in close proximity to him while he is in his automobile.

Wireless technologies, such as Wireless Access Protocol (WAP), are being implemented to provide Internet access to mobile devices, such as cellular phones and personal digital assistants (PDAs). WAP is a standard protocol for the transmission of data over low bandwidth wireless networks which allows a mobile device to browse the Internet. WAP is implemented using two key components, a WAP gateway and a microbrowser (i.e. mobile device software application). Together, these components enable mobile devices to access information on the Internet.

The WAP gateway converts HyperText Transfer Protocol (HTTP) formatted data to Wireless Mark-up Language (WML) formatted data and visa versa. WML is format which includes text information corresponding to web page selections. WML minimizes wireless bandwidth use because graphics are typically omitted. The WAP gateway may also provide additional information about the microbrowser device through HTTP headers, such as the user's cell phone number, its mobile (i.e., cellular) identifier, and location of the mobile device.

The microbrowser is a software application on a mobile device which receives WML formatted data from the WAP gateway and displays it on the mobile device's screen for the user to view. The microbrowser also sends WML information to the WAP gateway corresponding to the user's selection, such as an address of a web page that the user wishes access.

A challenge found with viewing a web page using a mobile device is the display size of the mobile device. Even with WAP, a web page may include too much information for the mobile device to effectively display. For example, a web page may include multiple options for a user to choose in which a limited number of those options are displayed at one time based upon the number of lines a mobile device is able to display.

A mobile Internet user occasionally locates a web page that appears to be interesting or useful. Due to the challenges described above, the user may not be able to effectively comprehend the content of the web page. Therefore, the user may want to revisit the web page at a later time in an environment offering suitable rendering characteristics (i.e. a computer monitor). A challenge found with revisiting the web page at a later time is remembering the address of the web page. What is needed, therefore, is a way to forward the address corresponding to a web page to a different location allowing the user to revisit the web page at a later time in an environment offering suitable rendering characteristics.

SUMMARY

It has been discovered that code may be added to a Wireless Access Protocol (WAP) gateway and a WAP mobile device to redirect URLs to a destination chosen by the user for later viewing. A URL is the acronym for Uniform Resource Locator and is the global address of files and resources, such as web pages, located on the World Wide Web, or "web." The WAP enabled mobile device is configured with URL redirection software which allows a user to forward a redirection request which includes one or more URL's to one or more redirect addresses. The WAP gateway includes code which receives the redirection request from the mobile device and sends a message which includes one or more URL's to corresponding redirect addresses through a computer network, such as the Internet.

When a user locates a web page that he wishes to send to a different location, the user selects a target redirect address from a list of addresses stored on the user's mobile device. If the target redirect address is not included in the pre-defined redirect address list, the user may add the target redirect address to the pre-defined redirect address list. The user has the option to enter a text message to describe the URL which is being sent. The additional text message is especially helpful when the URL is rather cryptic. For example, if the URL corresponds to a web page regarding sightseeing in Dallas, Tex., the user may enter "Dallas sights" to describe the URL, while the actual URL may be "http://www.acmecompany.com/page123.htm."

The user may select multiple redirect addresses for a single URL location. For example, a manager may find a web page that includes information about his company's competition. The manager may send the corresponding URL to himself and five of his employees. Another example is a user may locate a web page that is illegible on his mobile device's small screen. The user may redirect the corresponding URL location to his office email so that the user is able to view the web page either at work or at home on a larger screen, such as a computer monitor. The user is also able to assign a priority to individual redirect requests. Using the example described above, the user may be driving to his office and wish to view the web page immediately. The mobile user may assign a "high" priority to his work email redirect request, and assign a "normal" priority to his personal homepage redirect request.

Once the mobile user is finished selecting redirect entries, the mobile device sends a redirect request that includes one or more redirect entries through a wireless network to a WAP gateway. The WAP gateway receives the redirect request and notifies a redirect manager. The redirect manager may be a software application loaded on the WAP gateway which manages the redirection of URL locations received from wireless devices.

The redirect manager analyzes the priority corresponding to each redirect entry included in the redirect request. If a "high" priority is assigned to a redirect entry, the redirect manager sends the redirect message to the corresponding redirect address through a computer network, such as the Internet, upon receipt of the request. If a redirect entry is "Normal" priority, the redirect manager stores the redirect entry in a redirect storage area. At frequent intervals, such as every hour, the redirect manager retrieves stored redirect entries from the redirect storage area. The redirect managers sorts the redirect entries based upon their corresponding redirect address. The redirect manager creates a message to send to a redirect address, and includes each URL and optional URL text description which is currently stored in the redirect storage area. For example, if "JohnDoe@email.com" is the redirect address for five corresponding redirect entries, a message addressed to "JohnDoe@email.com" is created and the five URL's and text description corresponding to the redirect entries are included in the message. In addition, an identifier corresponding to the sender of the request may be included in the message so that the recipient can see who sent the corresponding URL links.

The redirect manager sends redirect messages to recipient destinations corresponding to the redirect address of the redirect entry. The redirect message may include the senders ID (i.e. name or phone number), one or more URL's, and optional text descriptions of corresponding URL's.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
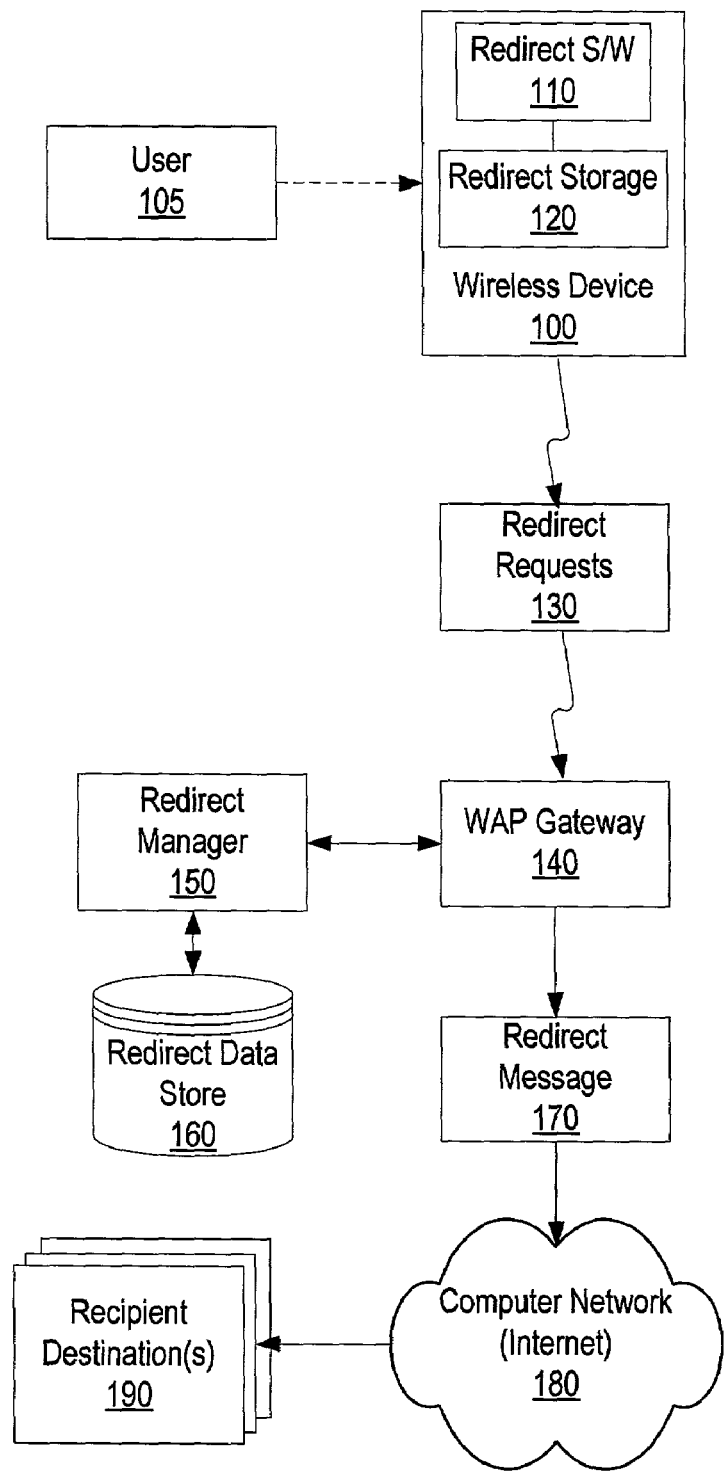
FIG. 1 is a high-level diagram showing a wireless device redirecting URL locations to recipients.

FIG. 1 is a high-level diagram showing a wireless device redirecting a URL location to one or more recipients. Wireless device 100 communicates with Wireless Access Protocol (WAP) gateway 140 through a wireless network, such as cdmaOne, GSM, cdma2000, and UMTS. Wireless device 100 may be a mobile device, such as a cellular phone or wireless PDA, that is capable of communicating with a WAP gateway. WAP gateway 140 converts HyperText Transfer Protocol (HTTP) formatted data received from computer network 180 to Wireless Mark-up Language (WML) formatted data to send to wireless device 100 and visa versa. WML is a format which includes text information corresponding to a web page. The WAP gateway may also provide additional information about wireless device 100, such as the device's identifier (such as a phone number corresponding to the wireless device), and the location of the wireless device.

User 105 selects a URL corresponding to a web page using wireless device 100. The request is sent to WAP gateway 140 which, in turn, retrieves the corresponding web page from computer network 180, converts the web page to WML if applicable, and sends the corresponding WML information back to wireless device 100. If user 105 chooses to redirect the URL (web page), wireless device 100 invokes redirect software 110. The user may choose to redirect a URL because the corresponding web page is illegible or because the corresponding web page includes information that user 105 wants to forward to another user or to one of his personal email accounts.

Redirect software 110 requests information from user 105 as to the redirect addressee and optional text associated with the URL. Redirect storage 120 is nonvolatile storage that includes pre-defined redirect addresses which user 105 may select. In addition, user 105 may add a new redirect address and store it in redirect storage 120 (see FIG. 3 and corresponding text for further details regarding user selection and entry).

Once redirect software 110 receives relevant information from user 105, wireless device 100 sends redirect request 130 to WAP gateway 140 through the wireless network. Redirect request 130 may include one or more redirect addresses, one or more URL's, a priority level for the redirect request, and optional text for each redirect entry describing the corresponding URL. WAP gateway 140 receives redirect request 130 and forwards the pertinent information to redirect manager 150 for processing. Redirect manager 150 is a software application that manages the redirection of URL locations received from wireless devices.

Redirect manager 150 analyzes the priority corresponding to each redirect entry. If a "high" priority is assigned to a redirect entry, redirect manager 150 sends a redirect message (redirect message 170) to corresponding recipient destination 190 through computer network 180, such as the Internet (see FIG. 6 and corresponding text regarding high-priority message redirection). If the priority of the redirect entry is "Normal", redirect manager 150 stores the redirect entry in redirect data store 160. Redirect data store 160 may be stored on a non-volatile storage area, such as a computer hard drive.

At certain intervals, such as every hour, redirect manager 150 retrieves redirect entries from redirect data store 160 and sorts the redirect entries based upon their corresponding redirect address. Redirect manager 150 creates a message to send to a redirect address, and includes each URL and optional URL text description which is currently stored in redirect data store 160. For example, if "JohnDoe@email.com" is the redirect address for five corresponding redirect entries, a message addressed to "JohnDoe@email.com" is created and the five URL's and text description corresponding to the redirect entries are included in the message. Redirect manager 150 sends redirect message 170 to recipient destination(s) 190 through computer network 180, such as the Internet (see FIG. 7 and corresponding text for further detail regarding normal priority message redirection).

Figure 2:
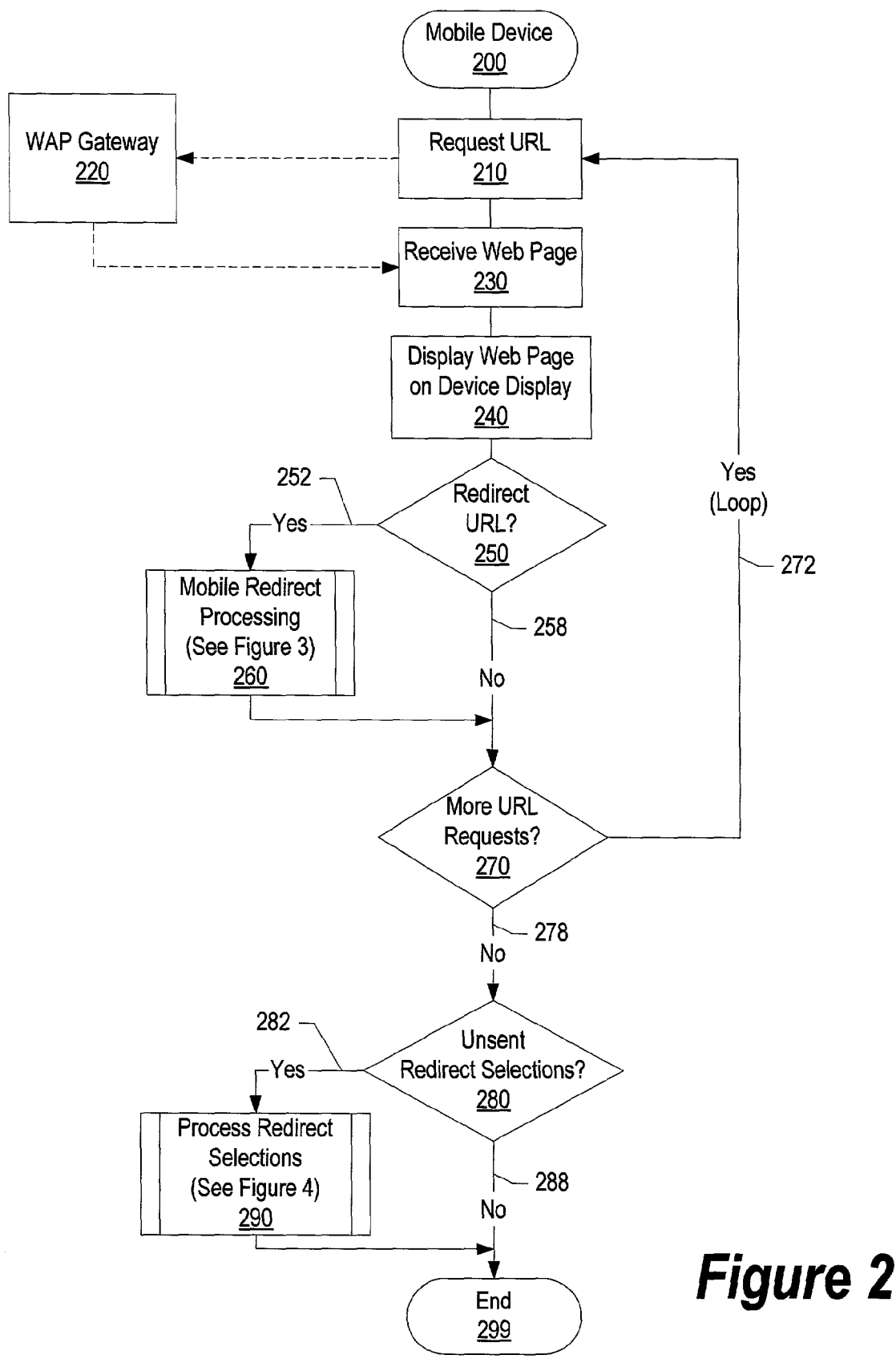
FIG. 2 is a flowchart showing steps taken by a mobile device receiving web pages and forwarding the corresponding URL location to a recipient.

FIG. 2 is a flowchart showing a mobile device receiving web pages and redirecting the corresponding URLs to a recipient. Mobile device processing commences at 200, whereupon URL request 210 is sent to Wireless Access Protocol (WAP) gateway 220. URL 210 request corresponds to the user selecting a web page, file, or other resource within the World Wide Web. The web page corresponding to the URL is received from WAP gateway 220 at step 230. The web page is displayed on the mobile device screen at step 240. A determination is made as to whether to redirect the web page (decision 250). The determination may be an automated process in which processing determines that the web page includes more detail than the mobile device screen is able to show, such as graphics or multiple selections. The determination may also be a manual process in which the user makes the choice to redirect the web page, even if the web page is readable on the mobile device's display. For example, the user may locate a web page which includes information that the user wishes to re-access at a future time. The user may choose to redirect the web page to his email account so he can bookmark the web page on his work or home computer.

Figure 3:
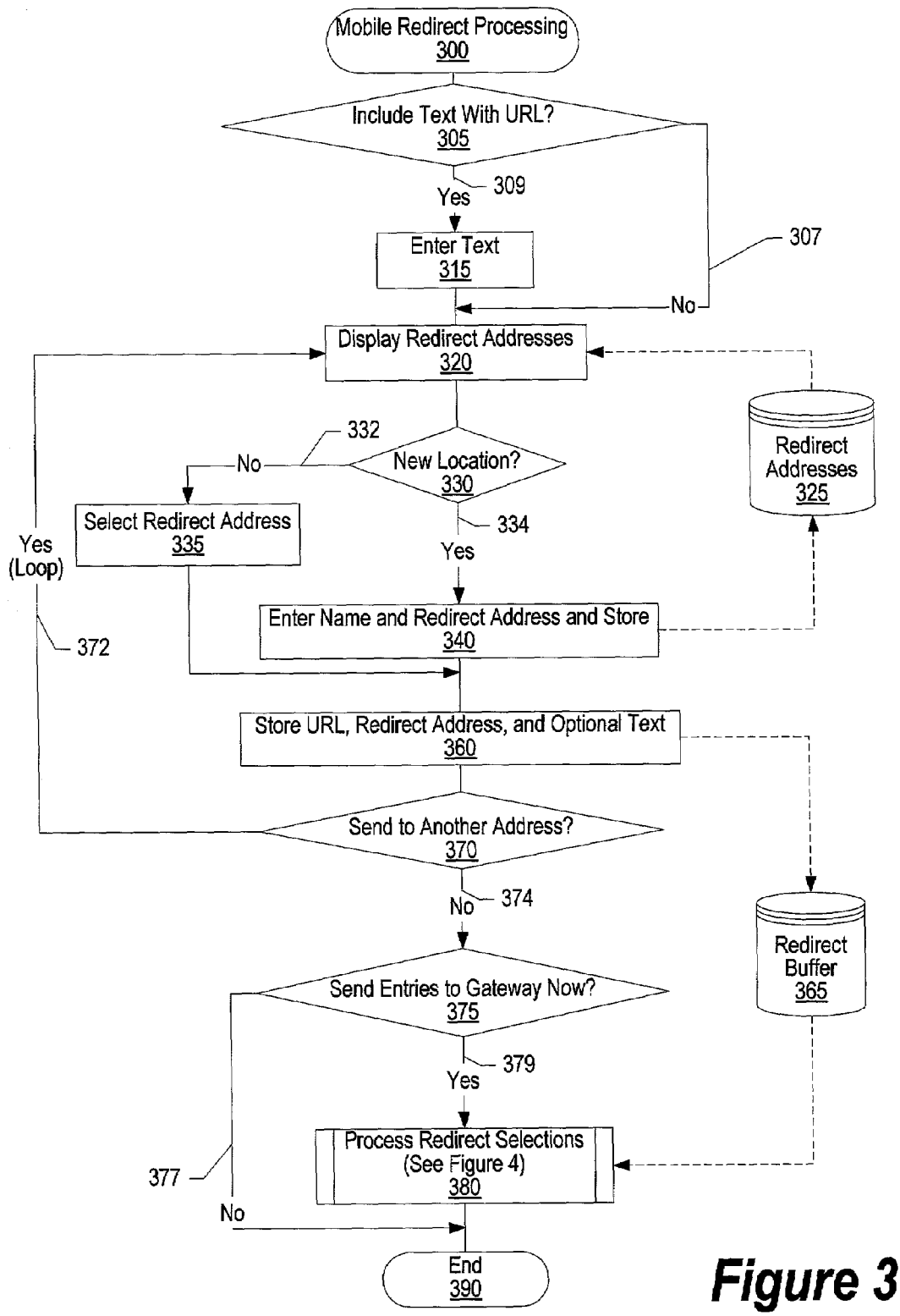
FIG. 3 is a flowchart showing steps taken by the mobile device in preparing URL locations to send to recipients.

If the web page is to be redirected, decision 250 branches to "Yes" branch 252 whereupon mobile redirect processing occurs (pre-defined process block 260, see FIG. 3 and corresponding text for further details). On the other hand, if the web page is not to be redirected, decision 250 branches to "No" branch 258 bypassing redirection processing.

A determination is made as to whether the user selects more URL's (decision 270). For example, the user may be browsing the Internet and wish to select multiple URL's. If the user selects more URL's decision 270 branches to "Yes" branch 272 which loops back to process the next URL. This looping continues until the user stops selecting URL's, at which point decision 270 branches to "No" branch 278.

A determination is made as to whether the mobile device currently has unsent redirect selections (decision 280). For example, the mobile device may have redirect entries stored in memory or a nonvolatile storage area that have not yet been sent to the WAP gateway. If the mobile device has unsent redirect selections, decision 280 branches to "Yes" branch 282 whereupon the unsent redirect selections are processed (pre-defined process block 290, see FIG. 4 and corresponding text for further details). If the mobile device does not have unsent redirect messages, decision 280 branches to "No" branch 288 whereupon processing ends at 299.

FIG. 3 is a flowchart showing steps taken in preparing URL locations to send to recipients. Redirect processing commences at 300, whereupon a determination is made as to whether to include a text message with a corresponding URL location (decision 305). For example, a user may decide to add the text "driving directions to Fred's house" to a URL that includes automobile driving directions to a person's home. If the user does not choose to include a text message with a corresponding URL, decision 305 branches to "No" branch 307 bypassing text entry steps. On the other hand, if the user chooses to include a text message with a corresponding URL, decision 305 branches to "yes" branch 309 whereupon the user enters a text message at step 315.

Stored redirect addresses are retrieved from redirect addresses store 325 and displayed on the mobile device screen (step 320). Redirect addresses store 325 may be stored on a non-volatile storage area, such as a computer hard drive or nonvolatile memory. A determination is made as to whether a target redirect address is included in the displayed pre-defined redirect addresses (decision 330). The target redirect address corresponds to where a mobile user wants to redirect the URL. If the target redirect address is included in the pre-defined redirect address list, decision 330 branches to "No" branch 332 whereupon the user selects a redirect address from the pre-defined redirect address list (step 335). On the other hand, if the target redirect address is not included in the pre-defined redirect address list, decision 330 branches to "Yes" branch 334 whereupon the user enters the name and address of the target recipient which is then stored in redirect addresses store 325 (step 340).

The URL, redirect address, and optional text are stored in redirect buffer 365 at step 360. Redirect buffer 365 may be stored on a non-volatile storage device, such as a computer hard drive or nonvolatile memory or in memory included in the mobile device. A determination is made as to whether the URL should be sent to another addressee (decision 370). For example, the user may wish to send the same URL to four of his co-workers. If the URL is to be sent to another addressee, decision 370 branches to "Yes" branch 372 which loops back to process the next redirect address. This looping continues until the user does not wish to send the URL to additional redirect addresses, at which point decision 370 branches to "No" branch 374.

A determination is made as to whether to send the redirect entries to the gateway (decision 375). If the user chooses to not send the entries at this time, decision 375 branches to "No" branch 377 bypassing redirect processing. The user may choose to send entries at a later time when he is browsing the Internet and thinks that he will be adding more redirect entries with different URL's to redirect buffer 365. In another embodiment, processing may wait until redirect buffer 365 is full before sending the redirect entries in order to save battery life by minimizing the amount of times the mobile device transmits to the WAP gateway.

Figure 4:
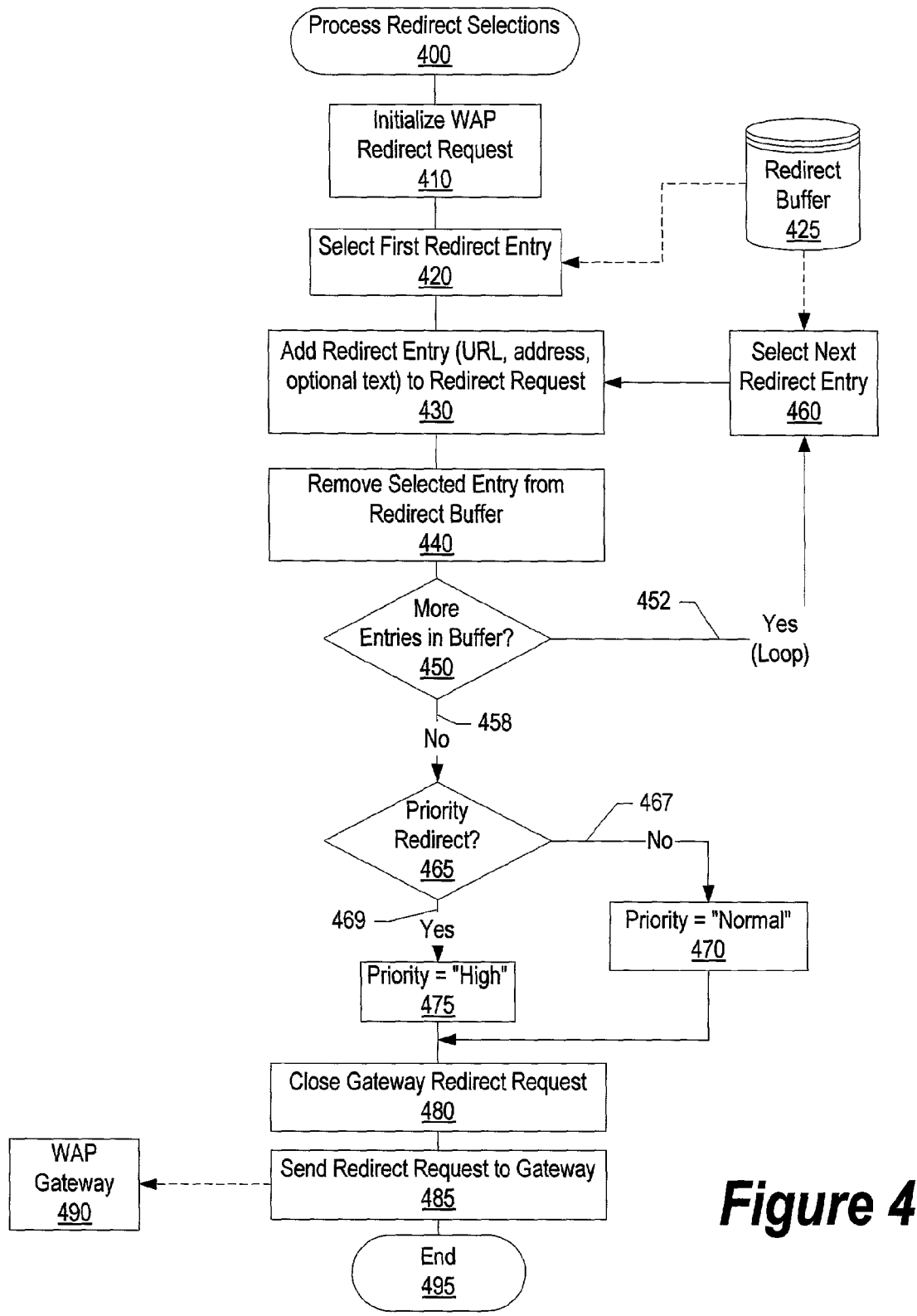
FIG. 4 is a flowchart showing URL locations being sent to a wireless Access Protocol (WAP) gateway.

On the other hand, if the user (or processing) chooses to send the redirect entries to the WAP gateway at this time, decision 375 branches to "Yes" branch 379 whereupon the redirect entries are processed (pre-defined process block 380, see FIG. 4 and corresponding text for further details). Processing ends at 390.

FIG. 4 is a flowchart showing URL locations sent to a wireless Access Protocol (WAP) gateway. Redirect processing commences at 400, whereupon a WAP redirect request is initialized (step 410). The initialization may include allocating a buffer or memory space to store redirect entries. The first redirect entry is selected from redirect buffer 425 (step 420). Redirect buffer 425 may be stored on a non-volatile storage area, such as a computer hard drive.

The redirect entry is added to the redirect request at step 430. The redirect entry includes a URL corresponding to a web page, the address of the redirect recipient, and optional text that may be included to describe the corresponding URL. The selected entry is removed from redirect buffer 425 at step 440. A determination is made as to whether there are more entries in redirect buffer 425 (decision 450). If there are more entries, decision 450 branches to "Yes" branch 452 which loops back to select (step 460) and process the next redirect entry. This looping continues until there are no more redirect entries in redirect buffer 425, at which point decision 450 branches to "No" branch 458.

A determination is made as to whether the redirect request is a priority request (decision 465). A priority request may be handled differently at the WAP gateway (see FIG. 6 and corresponding text for further details regarding priority requests). This determination may be made by the user selecting a priority level option on the mobile device display. If the redirect request is not a priority request, decision 465 branches to "No" branch 467 whereupon the priority corresponding to the redirect request is set to "Normal" (step 470). On the other hand, if the redirect request is a priority request, decision 465 branches to "Yes" branch 469 whereupon the priority corresponding to the redirect request is set to "high" (step 475).

The gateway redirect request is closed at step 480. The redirect request is sent to WAP gateway 490 at step 485. WAP gateway 490 analyzes the redirect requests and forwards the redirect entries to corresponding recipient(s) (see FIG. 5 and corresponding text for further details regarding WAP gateway processing). Mobile redirect processing ends at 495.

Figure 5:
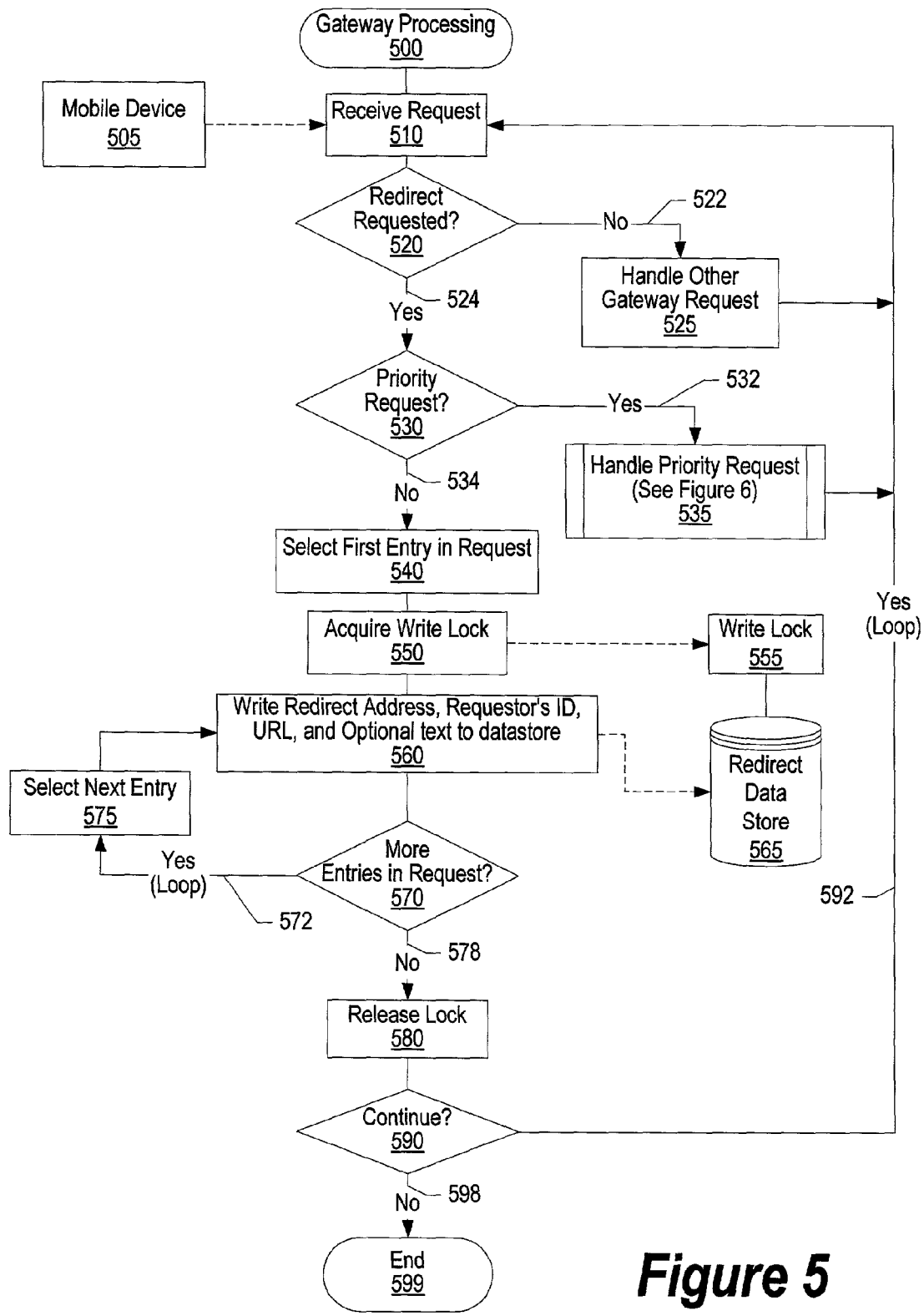
FIG. 5 is a flowchart showing steps taken in a Wireless Application Protocol (WAP) gateway that receives and processes redirect requests.

FIG. 5 is a flowchart showing steps taken by a Wireless Application Protocol (WAP) gateway that receives and processes redirect requests. Gateway processing commences at 500, whereupon a request is received from mobile device 505 (step 510). The request may be requesting to telephone someone, to retrieve a web page, or to redirect a web page. A determination is made as to whether the request is to redirect a web page (decision 520). If the request is not to redirect a web page, decision 520 branches to "No" branch 522 whereupon the gateway handles the request (step 525) and loops back to receive other requests.

On the other hand, if the request is to redirect a web page, decision 520 branches to "Yes" branch 524 whereupon a determination is made as to whether the web page redirection request is a priority request. For example, the web page may include information that a customer is waiting for and the user (i.e. salesperson) requests that the corresponding URL to be sent to the customer without delay. If the web page redirection request is a priority request, decision 530 branches to "Yes" branch 532 whereupon the priority request is processed (pre-defined process block 535, see FIG. 6 and corresponding text for further details) and processing loops back to receive other requests.

On the other hand, if the web page redirection request is not a priority request, decision 530 branches to "No" branch 534 to process the request in a "normal priority" manner. The first entry included in the request is selected at step 540. Processing acquires write lock 555 corresponding to redirect data store 565 at step 550. Write lock 555 is acquired to prevent other gateway processing threads from accessing redirect data store 565 while URL redirect entries are written to redirect data store 565. Redirect data store may be stored in a non-volatile storage area, such as a computer hard drive. Redirect data store 565 may also include a database, such as a relational database, managed by a database management system (DBMS).

The redirect entry including the redirect address, requestor's ID, URL, and optional text describing the URL are written to redirect data store 565 at step 560. The requestor's ID may be the requestor's wireless phone number or name and may be obtained through standard wireless protocols. A determination is made as to whether the redirect request includes more redirect entries (decision 570). If the redirect request includes more redirect entries, decision 570 branches to "Yes" branch 572 which loops back to select (step 575) and process the next entry. This looping continues until there are no more redirect entries to process in the redirect request, at which point decision 570 branches to "No" branch 578.

Write lock 555 is released at step 580 which allows other gateway processing threads to access redirect data store 565. A determination is made as to whether gateway processing continues processing mobile requests (decision 590). If processing is to continue processing mobile requests, decision 590 branches to "Yes" branch 592 which loops back to process more mobile device requests. This looping continues until processing terminates, at which point decision 590 branches to "No" branch 598 and gateway processing ends at 599.

Figure 6:
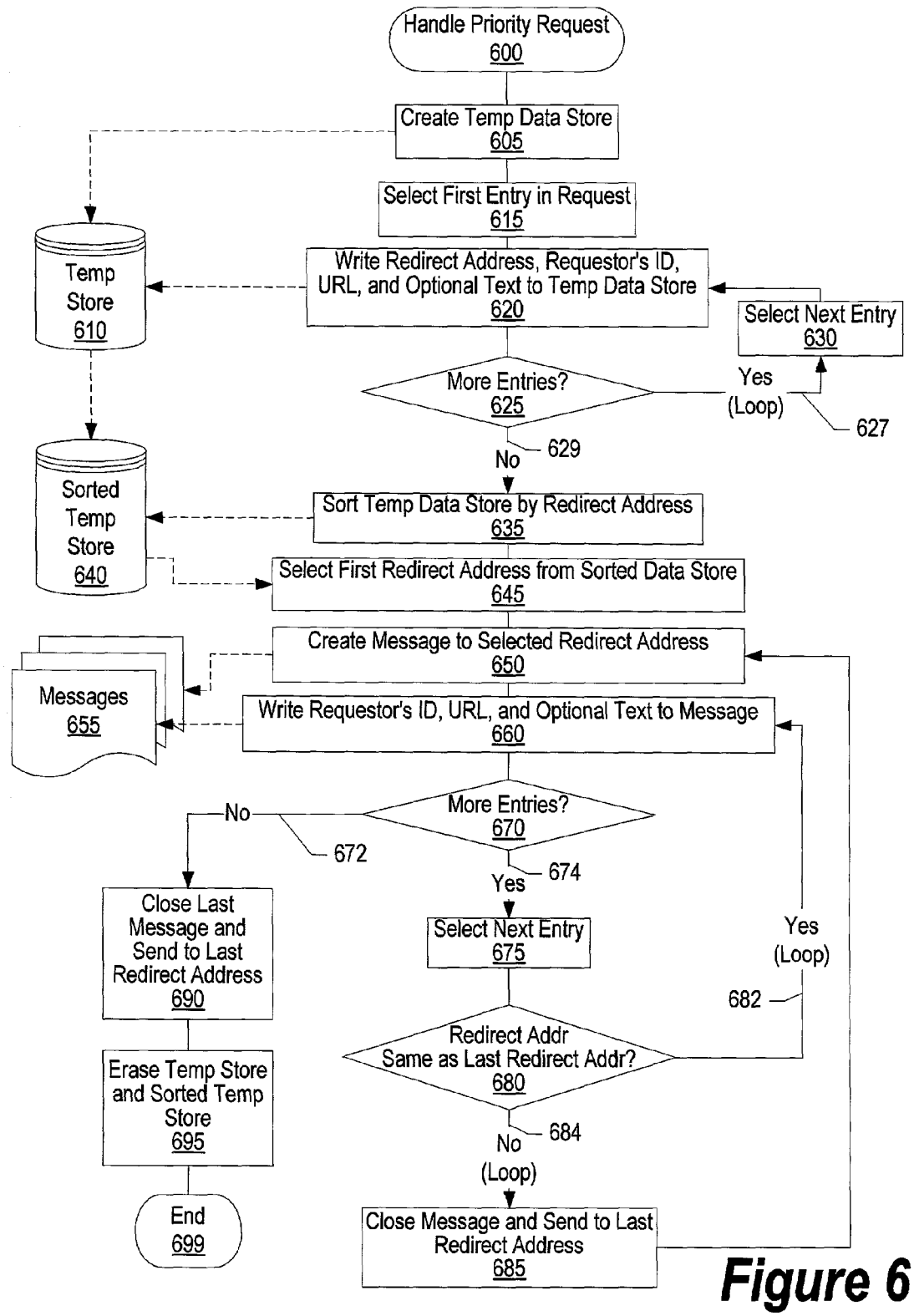
FIG. 6 is a flowchart showing the WAP gateway sending high priority redirect requests to recipients.

FIG. 6 is a flowchart showing steps taken by the WAP gateway in processing and sending high priority redirect requests to recipients. Priority request processing commences at 600, whereupon temporary data store 610 is created (step 605). Temporary data store 610 may be a memory partition or a file stored in a non-volatile storage area, such as a computer hard drive. Processing selects the first redirect entry in the priority request at step 615. The priority request may include one or more redirect entries with the same redirect address or different redirect addresses.

The first redirect entry including the redirect address, requestor's ID, URL, and optional text describing the URL are written to temporary data store 610 at step 620. The redirect address is the address to which the URL location is sent. The requestor's ID may be the requestor's wireless phone number and may be obtained through standard wireless protocols. A determination is made as to whether there are more than one entry included in the selected priority redirect request (decision 625). For example, the selected priority redirect request may include five redirect entries each addressed to the same redirect address. If there are more entries in the selected priority redirect request, decision 625 branches to "Yes" branch 627 which loops back to select (step 630) and process the next redirect entry. This looping continues until there are no more redirect entries to process in the selected priority redirect request, at which point decision 625 branches to "No" branch 629.

Processing sorts the redirect entries included in temporary store 610 based upon their corresponding redirect address and stores the sorted results in sorted temporary store 640 (step 635). Using the example described above, if "JohnDoe@email.com" is the redirect address for the five entries, the five entries are sorted such that they are next to each other in regards to order. Sorted temporary store 640 may be stored on a non-volatile storage area, such as a computer hard drive.

Processing selects the first redirect address from sorted temporary store 640 at step 645. Processing creates message 655 addressed to the corresponding redirect address at step 650. Using the example described above, message 655 is addressed to "JohnDoe@email.com". The first redirect entry information corresponding to the redirect address is written to message 655 at step 660. The redirect information includes the requestor's ID (i.e. phone number or name), the redirected URL, and optional text describing the redirected URL.

A determination is made as to whether there are more entries in sorted temporary store 640 (decision 670). If there are more entries in sorted temporary store 640, decision 670 branches to "Yes" branch 674 whereupon the next entry is selected at step 675. A determination is made as to whether the redirect address of the current redirect entry selection is the same as the redirect address of the prior redirect entry selection (decision 680). If the redirect addresses are the same, decision 680 branches to "Yes" branch 682 which loops back to write the current redirect entry information to message 655 which includes the corresponding redirect address. Using the example described above, the second redirect request addressed to "JohnDoe@email.com" is written to message 655 at this time.

On the other hand, if the current redirect address is different than the prior redirect address, decision 680 branches to "No" branch 684 whereupon processing closes and sends message 655 to the corresponding redirect address (step 685). Using the example described above, a message that includes five redirect entries is sent to "JohnDoe@email.com". Processing loops back to create a new message with the new redirect address (step 650) and process the redirect entries corresponding to the next redirect address.

When there are no more entries to process in sorted temporary store 640, decision 670 branches to "No" branch 672 whereupon the current message being processed is closed and sent to the corresponding redirect address (step 690). Temporary store 610 and sorted temporary store 640 are erased at 695, and processing ends at 699.

Figure 7:
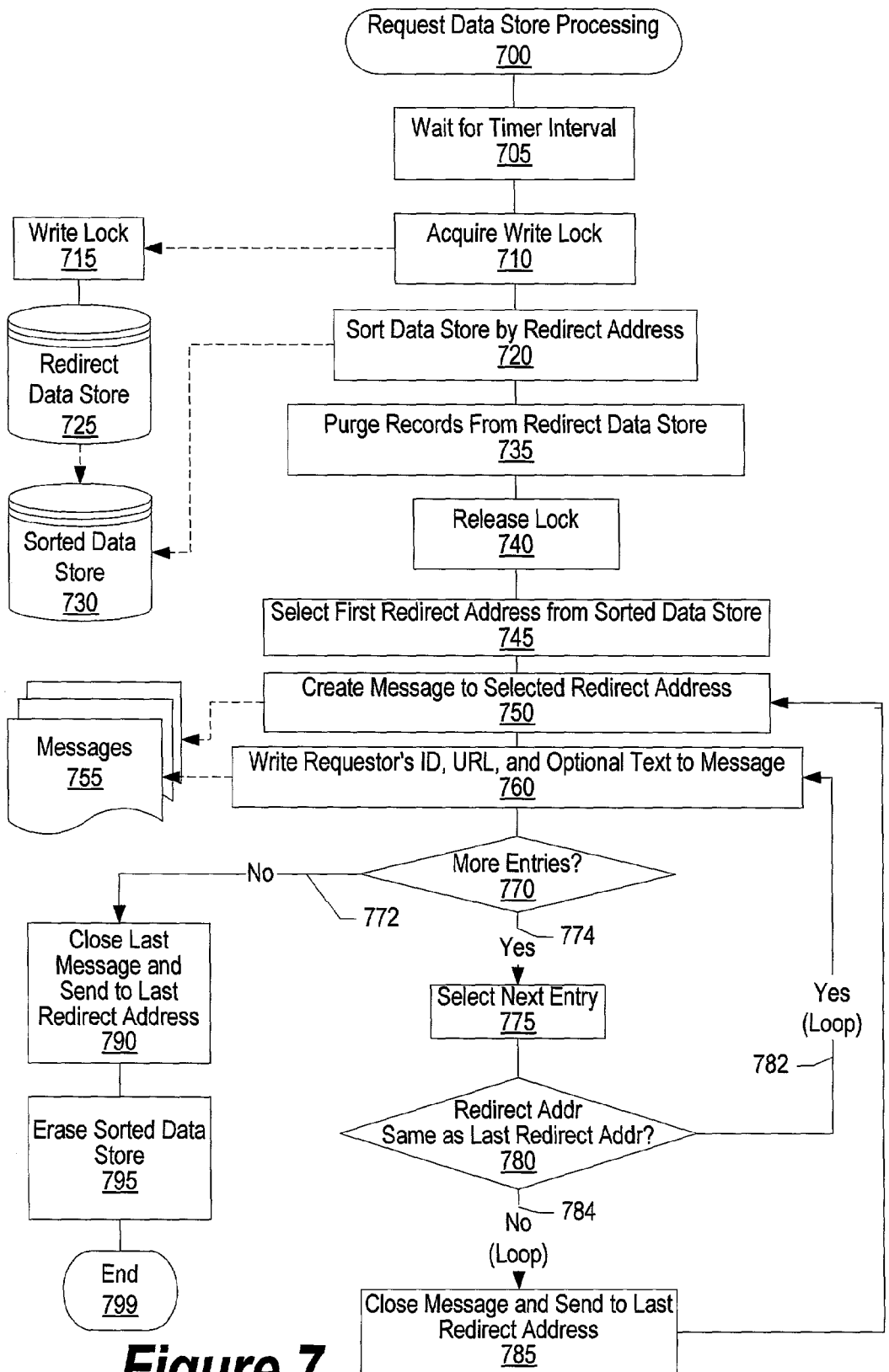
FIG. 7 is a flowchart showing the WAP gateway sending normal priority redirect requests to recipients.

FIG. 7 is a flowchart showing steps by the WAP gateway to send normal priority redirect requests to recipients. Redirect processing commences at 700, whereupon processing waits for a timer interval to expire in order to limit the frequency of the WAP gateway sending redirect messages (step 705). For example, the timer interval may be set for an hourly period in which the gateway sends redirect messages every hour.

When the timer interval expires, processing acquires write lock 715 corresponding to redirect data store 725 (step 710). Write lock 715 is acquired to prevent other gateway processing threads from accessing redirect data store 725 while redirect entries in redirect data store 725 are sorted and stored in sorted data store 730 (step 720).

The redirect entries may be sorted in alphabetical order based upon corresponding redirect addresses. Redirect data store 725 and sorted data store 730 may be stored in a non-volatile storage area, such as a computer hard drive.

After the redirect entries are sorted and stored in sorted data store 730, the redirect entries are purged from redirect data store 725 (step 735) and write lock 715 is released (step 740).

The redirect entries are now sorted based upon redirect address in sorted data store 730. The first redirect address is selected from sorted data store 730 at step 745. For example, the first redirect address may be "JohnDoe@email.com". Processing creates message 755 addressed to the corresponding redirect address at step 750. Using the example described above, message 755 is addressed to "JohnDoe@email.com". The first redirect entry information corresponding to the redirect address is written to message 755 at step 760. The redirect information includes the requestor's ID (i.e. phone number or name), the redirected URL, and optional text describing the redirected URL.

A determination is made as to whether there are more entries in sorted data store 730 (decision 770). If there are more entries in sorted data store 730, decision 770 branches to "Yes" branch 774 whereupon the next entry in sorted data store 730 is selected at step 775. A determination is made as to whether the redirect address of the current redirect entry selection is the same as the redirect address of the prior redirect entry selection (decision 780). If the redirect addresses are the same, decision 780 branches to "Yes" branch 782 which loops back to write the current redirect entry information to message 755 which includes the corresponding redirect address. Using the example described above, the second redirect request addressed to "JohnDoe@email.com" is written to message 755 at this time.

On the other hand, if the current redirect address is different than the prior redirect address, decision 780 branches to "No" branch 784 whereupon processing closes and sends message 755 to the corresponding redirect address (step 785). Using the example described above, a message that includes five redirect entries is sent to "JohnDoe@email.com". Processing loops back to create a new message with the new redirect address (step 750) and process the redirect entries corresponding to the new redirect address.

When there are no more entries to process in sorted data store 730, decision 770 branches to "No" branch 772 whereupon the current message being processed is closed and sent to the corresponding redirect address (step 790). Sorted data store 730 is erased at 795, and processing ends at 799.

Figure 8:
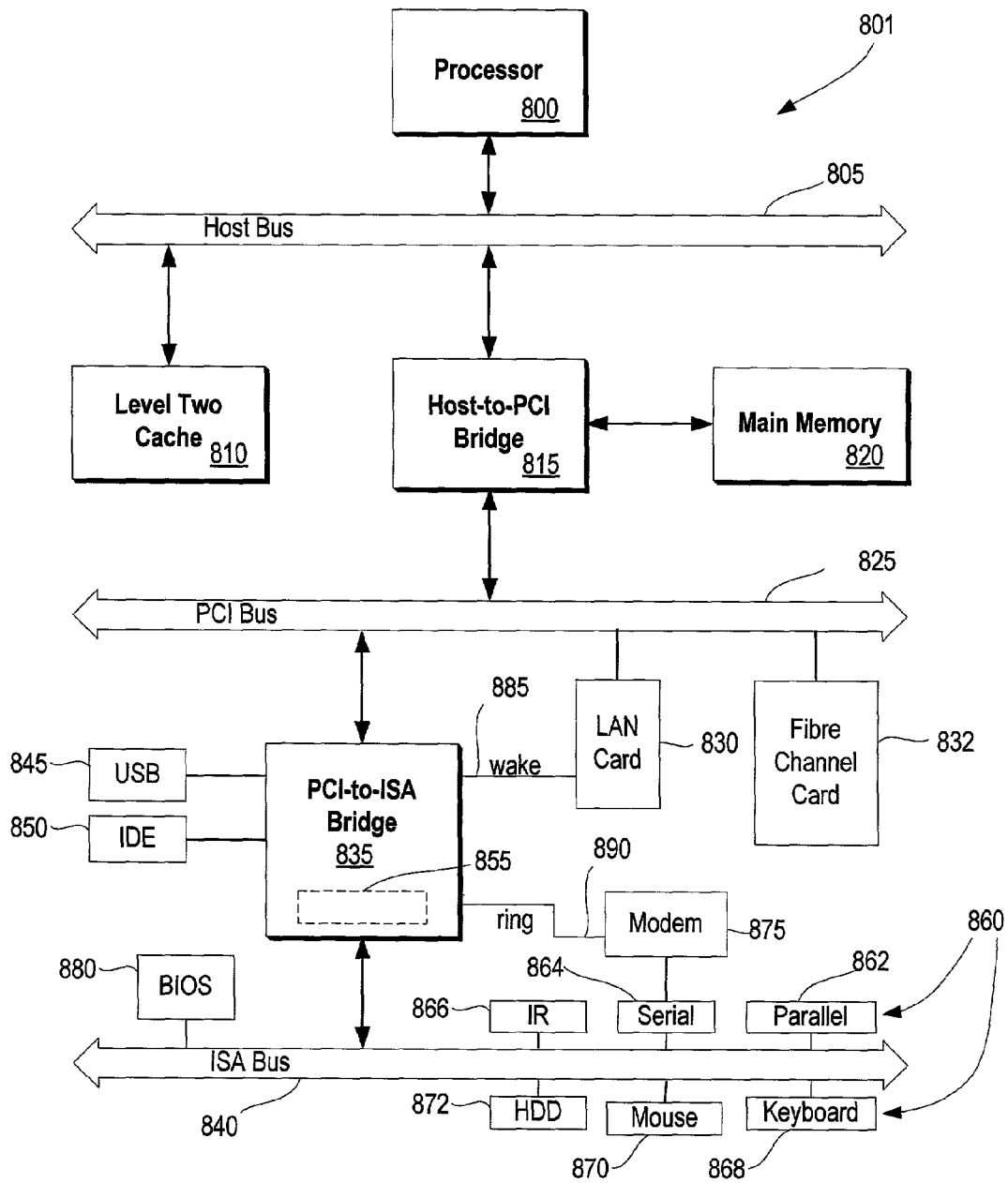
FIG. 8 is a block diagram of an information handling system capable of implementing the present invention.

FIG. 8 illustrates information handling system 801 which is a simplified example of a computer system capable of performing the server and client operations described herein. Computer system 801 includes processor 800 which is coupled to host bus 805. A level two (L2) cache memory 810 is also coupled to the host bus 805. Host-to-PCI bridge 815 is coupled to main memory 820, includes cache memory and main memory control functions, and provides bus control to handle transfers among PCI bus 825, processor 800, L2 cache 810, main memory 820, and host bus 805. PCI bus 825 provides an interface for a variety of devices including, for example, LAN card 830. PCI-to-ISA bridge 835 provides bus control to handle transfers between PCI bus 825 and ISA bus 840, universal serial bus (USB) functionality 845, IDE device functionality 850, power management functionality 855, and can include other functional elements not shown, such as a real-time clock (RTC), DMA control, interrupt support, and system management bus support. Peripheral devices and input/output (I/O) devices can be attached to various interfaces 860 (e.g., parallel interface 862, serial interface 864, infrared (IR) interface 866, keyboard interface 868, mouse interface 870, and fixed disk (HDD) 872) coupled to ISA bus 840. Alternatively, many I/O devices can be accommodated by a super I/O controller (not shown) attached to ISA bus 840.

BIOS 880 is coupled to ISA bus 840, and incorporates the necessary processor executable code for a variety of low-level system functions and system boot functions. BIOS 880 can be stored in any computer readable medium, including magnetic storage media, optical storage media, flash memory, random access memory, read only memory, and communications media conveying signals encoding the instructions (e.g., signals from a network). In order to attach computer system 801 to another computer system to copy files over a network, LAN card 830 is coupled to PCI bus 825 and to PCI-to-ISA bridge 835. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for redirecting network addresses from a source device to a destination device, said method comprising:
   receiving a redirect request, the redirect request including one or more redirect entries, wherein each redirect entry includes a redirect destination address, a priority level, and a network address;
   determining whether the priority level corresponding to one of the redirect entries is a high priority level or a normal priority level;
   in response to determining that the priority level corresponding to one of the redirect entries is the high priority level, the method further comprising:
      creating an electronic message wherein the electronic message is addressed to the redirect destination addresses corresponding to the one of the redirect entries;
      including one or more of the network addresses in the electronic message; and
      sending the electronic message to the redirect destination address; and
   in response to determining that the priority level corresponding to one of the redirect entries is the normal priority level, the method further comprising:
      storing the redirect entries corresponding to the normal priority level in a database, the storing resulting in one or more database entries;
      sorting the database entries based on their corresponding redirect destination addresses;
      waiting for a timer interval to expire; and
      in response to detecting that the timer interval has expired, performing the creating of the electronic message, the including of the one or more network addresses in the electronic message, and the sending of the electronic message to the redirect destination address.

2. The method as described in claim 1 wherein the receiving is performed by a WAP gateway and wherein the redirect request is sent from a wireless WAP client.

3. The method as described in claim 1 further comprising:
   creating the electronic message for each unique destination address from the destination addresses;
   including one or more network addresses in each of the electronic messages; and
   sending the electronic message to each of the unique destination addresses.

4. The method as described in claim 3 further comprising:
   removing the database entries after the sending of the electronic message.

5. The method as described in claim 1 wherein the redirect entries include textual descriptions corresponding to the network addresses, the textual descriptions included in the electronic messages.

6. The method as described in claim 1 wherein each of the network addresses corresponds to one or more Internet Web pages.

7. An information handling system comprising:
   one or more processors;
   a memory accessible by the processors;
   one or more nonvolatile storage devices accessible by the processors;
   a network address forwarding tool to forward network addresses, the network address forwarding tool including:
      means for receiving a redirect request, the redirect request including one or more redirect entries, wherein each redirect entry includes a redirect destination address, a priority level, and a network address;
      means for determining whether the priority level corresponding to one of the redirect entries is a high priority level or a normal priority level;
      in response to determining that the priority level corresponding to one of the redirect entries is the high priority level, the information handling system further comprising:
         means for creating an electronic message wherein the electronic message is addressed to the redirect destination addresses corresponding to the one of the redirect entries;
         means for including one or more of the network addresses in the electronic message; and
         means for sending the electronic message to the redirect destination address; and
      in response to determining that the priority level corresponding to one of the redirect entries is the normal priority level, the information handling system further comprising:
         means for storing the redirect entries corresponding to the normal priority level in a database, the storing resulting in one or more database entries;
         means for sorting the database entries based on their corresponding redirect destination addresses;
         means for waiting for a timer interval to expire; and
         in response to detecting that the timer interval has expired, means for performing the creating of the electronic message, the including of the one or more network addresses in the electronic message, and the sending of the electronic message to the redirect destination address.

8. The information handling system as described in claim 7 wherein the means for receiving is performed by a WAP gateway and wherein the redirect request is sent from a wireless WAP client.

9. The information handling system as described in claim 7 further comprising:
    means for creating the electronic message for each unique destination address from the destination addresses;
    means for including one or more network addresses in each of the electronic messages; and
    means for sending the electronic messages to each of the unique destination addresses.

10. The information handling system as described in claim 7 wherein the redirect entries include textual descriptions corresponding to the network addresses, the textual descriptions included in the electronic messages.

11. A computer program product stored in a computer-readable medium, the computer-readable medium containing instructions for execution by a computer, which, when executed by the computer, cause the computer to implement a method for redirecting a network address from a source device to a destination device, the method comprising:
    receiving a redirect request, the redirect request including one or more redirect entries, wherein each redirect entry includes a redirect destination address, a priority level, and a network address;
    determining whether the priority level corresponding to one of the redirect entries is a high priority level or a normal priority level;
    in response to determining that the priority level corresponding to one of the redirect entries is the high priority level, the method further comprising:
        creating an electronic message wherein the electronic message is addressed to the redirect destination addresses corresponding to the one of the redirect entries;
        including one or more of the network addresses in the electronic message; and
        sending the electronic message to the redirect destination address; and
    in response to determining that the priority level corresponding to one of the redirect entries is the normal priority level, the method further comprising:
        storing the redirect entries corresponding to the normal priority level in a database, the storing resulting in one or more database entries;
        sorting the database entries based on their corresponding redirect destination addresses;
        waiting for a timer interval to expire; and in response to detecting that the timer interval has expired, performing the creating of the electronic message, the including of the one or more network addresses in the electronic message, and the sending of the electronic message to the redirect destination address.

12. The computer program product as described in claim 11 wherein the receiving is performed by a WAP gateway and wherein the redirect request is sent from a wireless WAP client.

13. The computer program product as described in claim 11 wherein the method further comprises:
    creating the electronic message for each unique destination address from the destination addresses;
    including one or more network addresses in each of the electronic messages; and
    sending the electronic messages to each of the unique destination addresses.

14. The computer program product as described in claim 13 wherein the method further comprises:
    removing the database entries after the sending of the electronic messages.

15. The computer program product as described in claim 11 wherein the redirect entries include textual descriptions corresponding to the network addresses, the textual descriptions included in the electronic messages.

16. The computer program product as described in claim 11 wherein each of the network addresses corresponds to one or more Internet Web pages.

* * * * *